US012096182B2

(12) United States Patent
Irii et al.

(10) Patent No.: US 12,096,182 B2
(45) Date of Patent: Sep. 17, 2024

(54) CAPACITIVE-TYPE ELECTRO-ACOUSTIC TRANSDUCER

(71) Applicant: Audio-Technica Corporation, Tokyo (JP)

(72) Inventors: Koichi Irii, Tokyo (JP); Hiroshi Akino, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 143 days.

(21) Appl. No.: 17/932,747

(22) Filed: Sep. 16, 2022

(65) Prior Publication Data

US 2023/0019307 A1 Jan. 19, 2023

Related U.S. Application Data

(63) Continuation of application No. PCT/JP2021/008354, filed on Mar. 4, 2021.

(30) Foreign Application Priority Data

Mar. 30, 2020 (JP) ................................ 2020-059618

(51) Int. Cl.
*H04R 19/02* (2006.01)
*H04R 1/10* (2006.01)

(52) U.S. Cl.
CPC ............... *H04R 19/02* (2013.01); *H04R 1/10* (2013.01)

(58) Field of Classification Search
CPC ........ H04R 19/02; H04R 1/10; H04R 19/013; H04R 1/1041; H04R 3/06
See application file for complete search history.

(56) References Cited

U.S. PATENT DOCUMENTS

| | | | | |
|---|---|---|---|---|
| 6,510,231 | B2 * | 1/2003 | Barnert .................. | H04R 19/00 381/174 |
| 2001/0046306 | A1 | 11/2001 | Barnert | |
| 2012/0002826 | A1 | 1/2012 | Wu | |
| 2013/0202127 | A1 * | 8/2013 | Miyakura ............ | H04R 19/013 381/74 |
| 2014/0064510 | A1 | 3/2014 | Grinnip, III | |
| 2017/0289667 | A1 | 10/2017 | Okita | |
| 2017/0325014 | A1 | 11/2017 | Wen | |

(Continued)

FOREIGN PATENT DOCUMENTS

| | | | |
|---|---|---|---|
| JP | 852063421 | U | 5/1975 |
| JP | S52-063421 | U | 5/1977 |

(Continued)

*Primary Examiner* — Tuan D Nguyen
(74) *Attorney, Agent, or Firm* — WC&F IP

(57) ABSTRACT

An earphone includes a resonance circuit that outputs an adjusted signal obtained by making a signal component of a predetermined frequency contained in an electric signal outputted from a sound source device larger than a signal component of another frequency, a fixed electrode that is fixed to a housing, a diaphragm that is provided facing the fixed electrode and that vibrates according to a potential difference generated between the diaphragm and the fixed electrode on the basis of the adjusted signal, a contact part that contacts a partial region of the diaphragm and presses the partial region against the fixed electrode, and a sound emitting part that emits sound generated by vibration of the diaphragm to the outside of the housing.

12 Claims, 15 Drawing Sheets

(56) References Cited

U.S. PATENT DOCUMENTS

| | | | |
|---|---|---|---|
| 2018/0184193 | A1 | 6/2018 | Zheng et al. |
| 2020/0196047 | A1 | 6/2020 | Irii et al. |

FOREIGN PATENT DOCUMENTS

| | | | |
|---|---|---|---|
| JP | 2001-245393 | A | 9/2001 |
| JP | 2013-034120 | A | 2/2013 |
| JP | 201334120 | A | 2/2013 |
| JP | 2015-531557 | A | 11/2015 |
| JP | 59978-6 | B1 | 9/2016 |
| JP | 2017-183851 | A | 10/2017 |
| JP | 2017-204844 | A | 11/2017 |
| JP | 2020-098957 | A | 6/2020 |
| JP | 202098957 | A | 6/2020 |

* cited by examiner

CAPACITIVE-TYPE ELECTRO-ACOUSTIC TRANSDUCER

CROSS-REFERENCE TO RELATED APPLICATIONS

The present application is a continuation application of International Application number PCT/JP2021/008354, filed on Mar. 4, 2021, which claims priority under 35 U.S.C § 119(a) to Japanese Patent Application No. 2020-059618, filed on Mar. 30, 2020. The contents of these applications are incorporated herein by reference in their entirety.

BACKGROUND OF THE INVENTION

The present disclosure relates to a capacitive-type electro-acoustic transducer that transduces an electric signal into sound.

There is known a capacitive-type electro-acoustic transducer that transduces an electric signal into sound using vibration of a diaphragm caused by the electric signal. Japanese Unexamined Patent Application Publication No. 2017-204844 discloses a magnetic-type earphone that generates sound by passing a current through a coil disposed in a magnetic circuit and vibrating a diaphragm by changing the attractive force of the coil.

A frequency bandwidth (that is, a dynamic range) in which a magnetic-type earphone can reproduce sound is narrow. For this reason, in order to achieve a wide dynamic range, it is necessary to combine a plurality of units for low-pitched sound, medium-pitched sound, and high-pitched sound, resulting in a larger number of components and making miniaturization more difficult than with a capacitor headphone (capacitive-type headphone).

On the other hand, in order to increase the sensitivity of the capacitor headphone, it is necessary to i) increase capacitance and ii) reduce a distance between a diaphragm and a fixed electrode. However, there is a problem that if the distance between the diaphragm and the fixed electrode is made too small, the diaphragm comes into contact with the fixed electrode due to vibration, resulting in a short circuit.

BRIEF SUMMARY OF THE INVENTION

The present disclosure focuses on these points, and an object thereof is to provide a capacitive-type electro-acoustic transducer capable of achieving a wide dynamic range and miniaturization.

A capacitive-type electro-acoustic transducer according to the present disclosure includes a resonance circuit that outputs an adjusted signal obtained by making a signal component of a predetermined frequency contained in an electric signal outputted from a sound source device larger than a signal component of another frequency, a fixed electrode that is fixed to a housing, a diaphragm that is provided facing the fixed electrode and that vibrates according to a potential difference generated between the diaphragm and the fixed electrode on the basis of the adjusted signal, a contact part that contacts a partial region of the diaphragm and presses the partial region against the fixed electrode, and a sound emitting part that emits sound generated by vibration of the diaphragm to the outside of the housing.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Overview of Electro-Acoustic Transducing System S]

Figure 1:
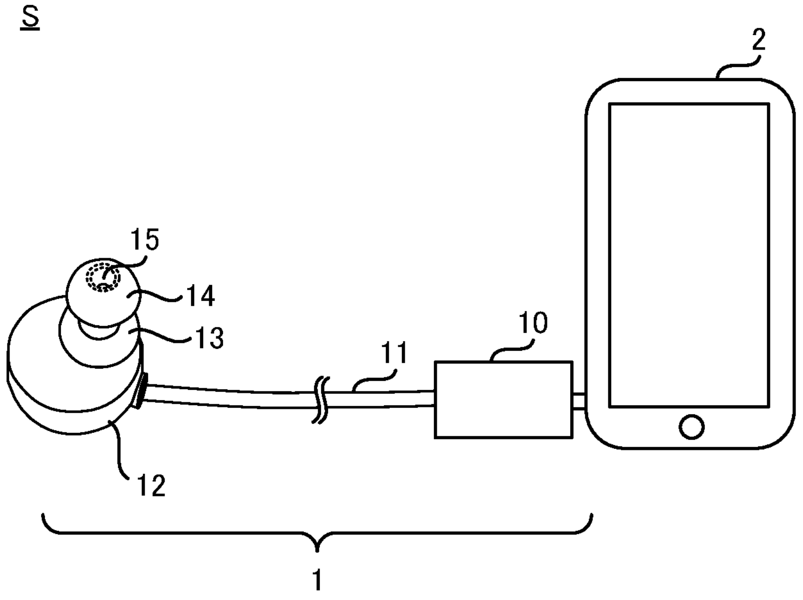
FIG. 1 shows a configuration of an electro-acoustic transducing system S.

FIG. 1 shows a configuration of an electro-acoustic transducing system S. The electro-acoustic transducing system S includes an earphone 1 and a sound source device 2. The earphone 1 is an example of a capacitive-type electro-acoustic transducer that transduces an electric signal outputted from the sound source device 2 into sound and emits the sound to the outside.

The sound source device 2 is a smartphone, computer, or audio player that is an information terminal for executing an application program and outputting an electric signal on the basis of sound source data containing music or voice, for example. The sound source device 2 may store the sound source data in a storage medium or acquire the sound source data from an external device via a communication line.

Figure 2A:
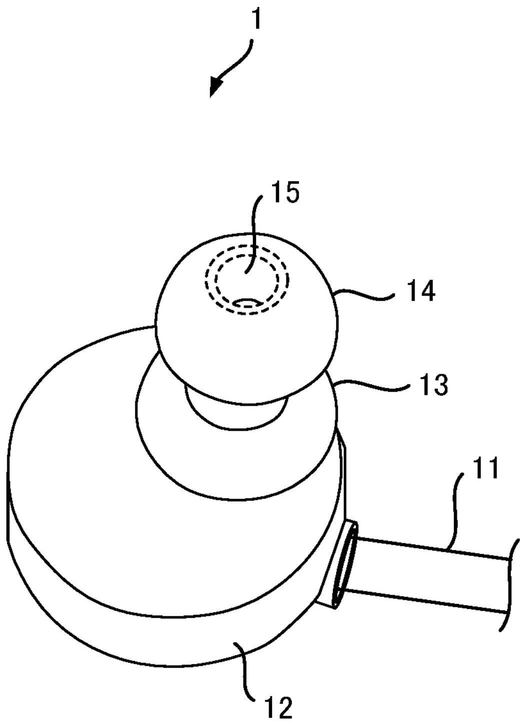
FIGS. 2A and 2B are enlarged views of an earphone 1.
Figure 2B:
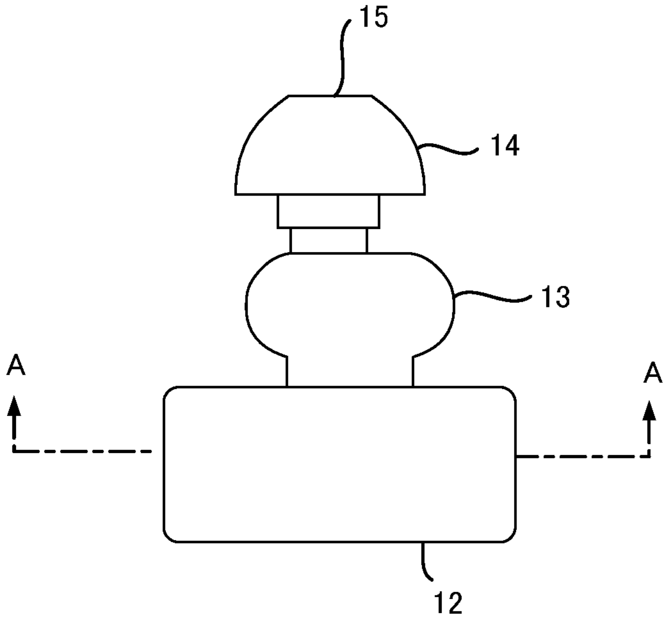

FIGS. 2A and 2B are enlarged views of the earphone 1. FIG. 2A is a perspective view of the earphone 1, and FIG. 2B is a side view of the earphone 1. The earphone 1 is an electret-type capacitive-type electro-acoustic transducer, for example, and transduces an electric signal into sound by changing capacitance between a fixed electrode and a diaphragm. Therefore, the earphone 1 does not have a magnet for generating the sound.

The earphone 1 includes a connecting part 10, a cable 11, a rear housing 12, a front housing 13, and an earpiece 14. An opening 15 is formed at the tip of the earpiece 14 to emit the sound to the outside.

The connecting part 10 is connected to a terminal for outputting the sound in the sound source device 2, and includes an amplifier for amplifying the electric signal outputted from the terminal. The sensitivity of the capacitive-type electro-acoustic transducer is lower than that of a dynamic-type electro-acoustic transducer or a balanced-armature-type electro-acoustic transducer. Therefore, in the capacitive-type electro-acoustic transducer, the electric signal is amplified by the connecting part 10 such that a volume suitable for music appreciation can be outputted. The amplifier may include a step-up transformer or an amplifier for signal amplification.

The cable 11 is a cable for transmitting the electric signal supplied from a sound source. The rear housing 12 is provided between the cable 11 and the front housing 13. The rear housing 12 includes an electro-acoustic transducer 20 that transduces the electric signal transmitted through the cable 11 into sound. Details of the internal configuration of the electro-acoustic transducer 20 will be described later.

The front housing 13 is provided between the rear housing 12 and the earpiece 14, and has a structure in which an angle of the front housing 13 with respect to the rear housing 12 is variable. The earpiece 14 is a part inserted into an ear of a user of the earphone 1, and is coupled to a sound conduit protruding into the front housing 13. The earpiece 14 emits the sound generated by the electro-acoustic transducer 20 through the opening 15.

[Detailed Configuration of Electro-Acoustic Transducer 20]

Figure 3:
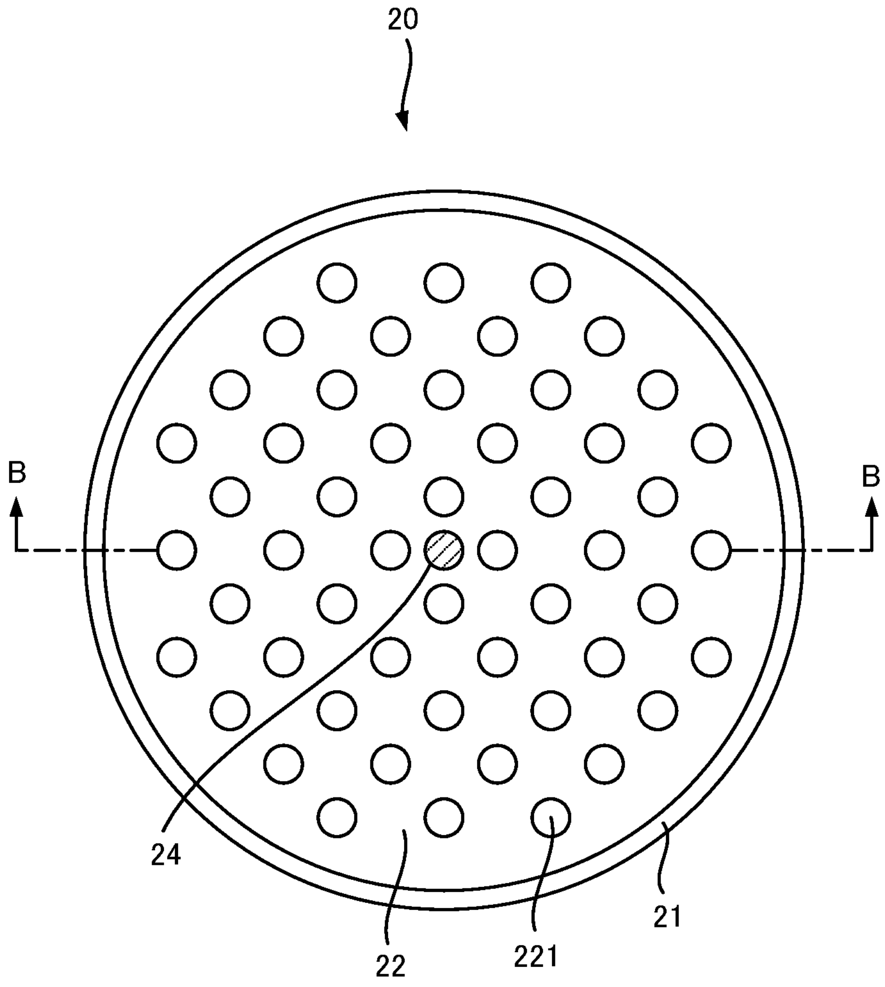
FIG. 3 is a cross-sectional view at a line A-A in FIG. 2B.
Figure 4:
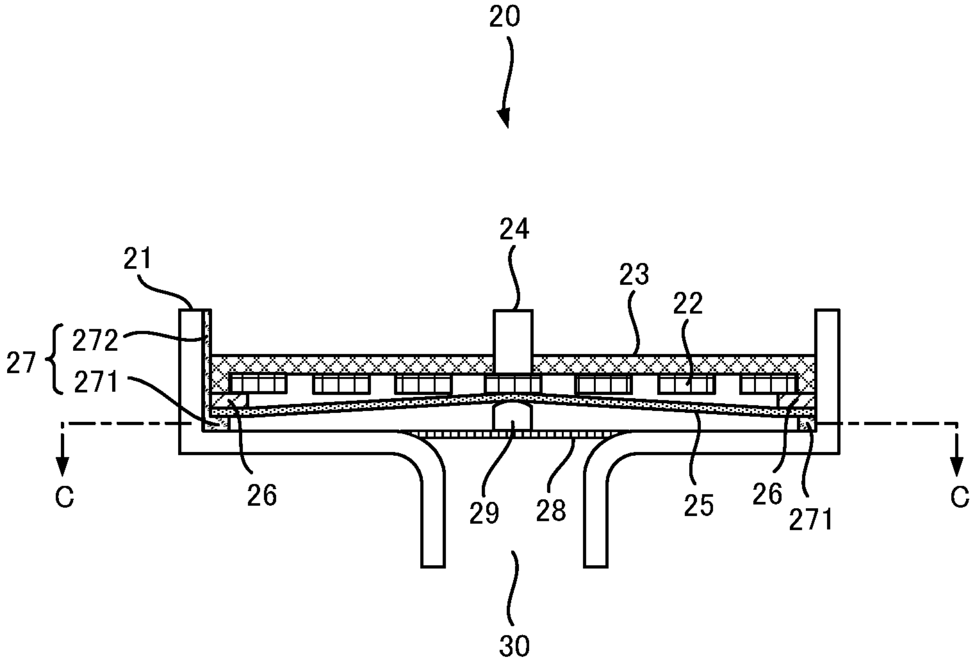
FIG. 4 is a cross-sectional view at a line B-B in FIG. 3.
Figure 5:
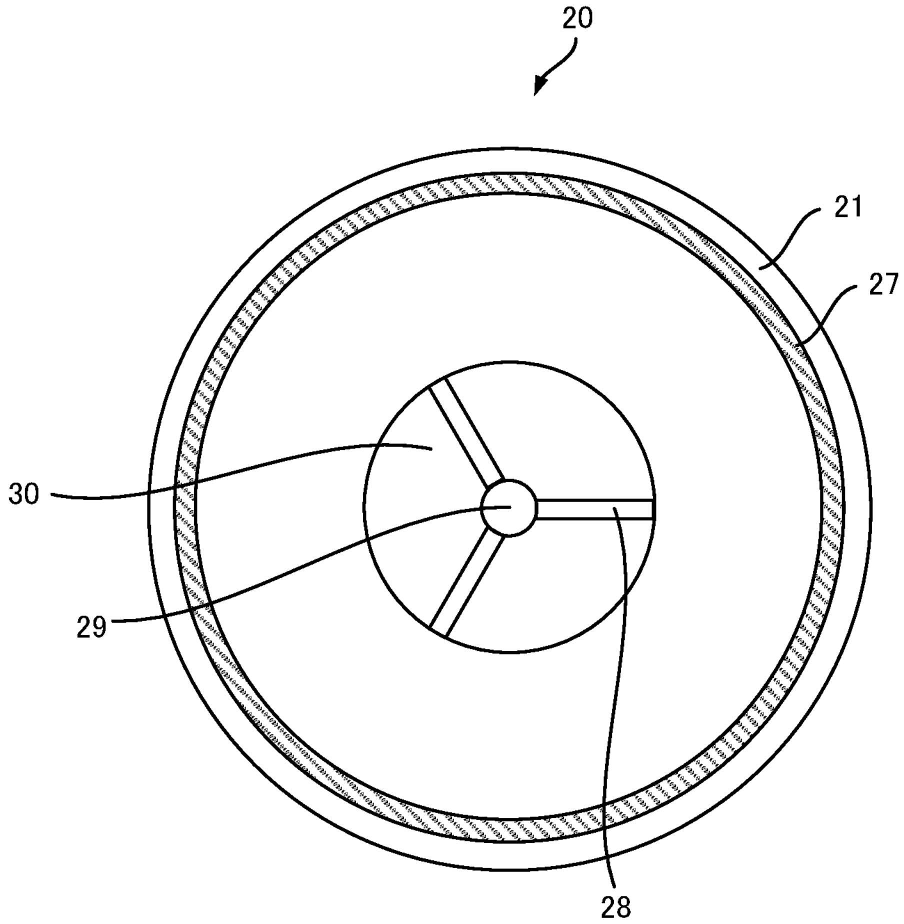
FIG. 5 shows an earpiece 14 viewed from a line C-C in FIG. 4.

FIGS. 3 to 5 schematically show the internal configuration of the electro-acoustic transducer 20. FIG. 3 is a cross-sectional view at a line A-A in FIG. 2B. FIG. 4 is a cross-sectional view at a line B-B in FIG. 3. FIG. 5 shows the earpiece 14 viewed from a line C-C in FIG. 4.

As shown in FIGS. 3 to 5, the electro-acoustic transducer 20 includes a housing 21, a fixed electrode 22, a fixed electrode cover 23, a terminal 24, a diaphragm 25, an insulating member 26, a conductive member 27, a displacement part 28, and a contact part 29.

The housing 21 is made of resin, for example, and has a space for accommodating components for generating sound on the basis of the electric signal supplied from the sound source. The housing 21 includes a sound emitting part 30 that is connected to said space. The sound emitting part 30 emits the sound generated on the basis of the electric signal to the outside through the earpiece 14. The sound emitting part 30 is a cylindrical portion and extends toward the earpiece 14, for example. The housing 21 may function as an exterior member of the rear housing 12.

A portion of the housing 21 that receives the electric signal is coupled to the connecting part 10 via the cable 11, and a portion of the housing 21 that emits the sound is coupled to the earpiece 14. The examples shown in FIGS. 3 to 5 show a case where the housing 21 has a circular cross section, but the shape of the housing 21 is arbitrary and the housing 21 may have a polygonal cross section.

The fixed electrode 22 is made of a plate-shaped conductive member (for example, aluminum). The fixed electrode 22 generates an electric field between the fixed electrode 22 and the diaphragm 25 caused by an external electric field generated by an electret, for example. Further, the fixed electrode 22 and the diaphragm 25 each receive the electric signal inputted from the sound source, via the terminal 24 and the conductive member 27. Instead of the electret, the fixed electrode 22 may generate the electric field between the fixed electrode 22 and the diaphragm 25 by using a bias voltage applied through the terminal 24.

The fixed electrode 22 is fixed to the housing 21 by the fixed electrode cover 23, for example. The shape and size of the fixed electrode 22 are arbitrary, but the fixed electrode 22 has a disc shape with a diameter of 20 mm, for example. The fixed electrode 22 has a plurality of sound holes 221 that allow the sound generated by the vibration of the diaphragm 25 to pass through.

The fixed electrode cover 23 has a concave portion for accommodating the fixed electrode 22. The fixed electrode cover 23 is made of an insulating member. Since the periphery of the fixed electrode 22 is surrounded by the insulating member, the fixed electrode 22 and the conductive member 27 described later are electrically insulated from each other.

The terminal 24 is a conductive terminal for supplying the electric signal to the fixed electrode 22. The terminal 24 is a first conductive part connected to the fixed electrode 22, and is located on the opposite side of the fixed electrode 22 from the sound emitting part 30. The terminal 24 is electrically coupled to the fixed electrode 22. The electric signal supplied from the sound source is superimposed on the bias voltage or the surface potential of the electret, and inputted from the terminal 24.

The diaphragm 25 is provided to face the fixed electrode 22, and is a diaphragm that vibrates on the basis of the electric signal supplied from the sound source. The diaphragm 25 is made of a thin film having conductivity. The diaphragm 25 is made of a metal foil or a polymer film on which gold is deposited, for example.

The diaphragm 25 vibrates in accordance with a potential difference generated by the electric signal supplied from the sound source device 2. Specifically, the diaphragm 25 vibrates in accordance with the potential difference generated between the diaphragm 25 and the fixed electrode 22 on the basis of the electric signal applied through the terminal 24 and the conductive member 27. More specifically, the diaphragm 25 vibrates in accordance with the potential difference generated between the diaphragm 25 and the fixed electrode 22 on the basis of an adjusted signal, which is the electric signal after the frequency characteristics of the electric signal is adjusted by a resonance circuit 122 described later.

A partial region of the diaphragm 25 (a center portion in the example shown in FIG. 4) is pressed against the fixed electrode 22 by the contact part 29, and a distance between the diaphragm 25 and the fixed electrode 22 in the partial region is narrower than the distance between the diaphragm 25 and the fixed electrode 22 outside this partial region. In the example shown in FIG. 4, the distance between the diaphragm 25 and the fixed electrode 22 increases from the center of the diaphragm 25 toward the periphery of the diaphragm 25. The diaphragm 25 contacts the fixed electrode 22 in the partial region due to the pressure applied by the contact part 29. This configuration of the diaphragm 25 increases the sensitivity of the electro-acoustic transducer 20 to the electric signal over a wide range of frequencies because the distance between the diaphragm 25 and the fixed electrode 22 varies with the position of the diaphragm 25.

Further, since the distance between at least the partial region of the diaphragm 25 and the fixed electrode 22 can be reduced, the capacitance of the electro-acoustic transducer 20 is increased. The larger capacitance of the electro-acoustic transducer 20 can reduce the inductance value of the inductor that constitutes the resonance circuit 122 described below. Furthermore, such a configuration contributes to reduction of the signal amplification caused by the connecting part 10. The conventional capacitive-type electro-acoustic transducer had to amplify the electric signal significantly in order to output a volume suitable for music appreciation. The configuration in which the distance between the fixed electrode and the partial region of the diaphragm is decreased can reduce the amplification degree of the electric signal, thus enabling a smaller step-up transformer or amplifier.

The insulating member 26 is provided to prevent the diaphragm 25 from being electrically connected to the fixed electrode 22, and is formed of resin, for example. The entire insulating member 26 may be made of an insulating member, or at least one of the surfaces of the insulating member 26 that contacts the fixed electrode 22 or the diaphragm 25 may have an insulating property.

The insulating member 26 has an annular shape, for example, and is sandwiched between the periphery of the diaphragm 25 and the fixed electrode 22. As a result, the periphery of the diaphragm 25 is fixed without contacting the fixed electrode 22, and the region in the diaphragm 25 that is not in contact with the insulating member 26 vibrates in accordance with the electric signal.

The conductive member 27 is a member for applying the electric signal to the diaphragm 25. The conductive member 27 is a second conductive part, and its portion proximate to the sound emitting part 30 with respect to the fixed electrode 22 is connected to the diaphragm 25. The conductive member 27 is made of a conductive sheet, for example. The conductive member 27 includes i) an annular part 271 that contacts the periphery of the diaphragm 25 and ii) an extending part 272 that extends from at least a part of the annular part 271 to an area opposite to the sound emitting part 30 with respect to the fixed electrode 22. The extending part 272 extends to the side of the rear housing 12 through the space between the housing 21, fixed electrode cover 23, and insulating member 26.

The displacement part 28 and the contact part 29 constitute a support part that supports the partial region of the diaphragm 25 toward the fixed electrode 22, and apply pressure to the partial region of the diaphragm 25. The displacement part 28 is made of a rod-shaped resin, spring, or rubber having elasticity, for example, and is displaced in a direction in which the diaphragm 25 is displaced in accordance with a change in pressure in the housing 21. Specifically, when the diaphragm 25 is displaced in response to a pressure change in the housing 21 that occurs when the earpiece 14, which is a part of the housing of the earphone 1, is attached to a person's ear or when the earpiece 14 is removed from the person's ear, the displacement part 28 is displaced by receiving a stress caused by the displacement of the diaphragm 25.

In the example shown in FIG. 5, the displacement part 28 is provided across the sound emitting part 30. The displacement part 28 includes one or more rod-shaped members that cross the sound emitting part 30. Specifically, the displacement part 28 includes the plurality of rod-shaped members, each having one end fixed to the opening of the sound emitting part 30. In the example shown in FIG. 5, the three rod-shaped members, arranged at 120° intervals and extending in different directions from the opening on the side proximate to the diaphragm 25 of the sound emitting part 30, are joined in the center of the sound emitting part 30, but the direction in which the rod-shaped members extend and the number of rod-shaped members are arbitrary.

The rod-shaped members of the displacement part 28 may be formed integrally with the housing 21, or rod-shaped member different from the housing 21 may be fixed to the housing 21 by an adhesive agent or the like. The rod-shaped members shown in FIG. 5 each have a uniform thickness, but the rod-shaped members may each have a shape that becomes thinner toward the center position of the opening of the sound emitting part 30 (that is, the position where the contact part 29 is provided). Since the rod-shaped members have such a shape, the coupling force between the rod-shaped members and the sound emitting part 30 is increased, and it is easier for the displacement part 28 to bend in response to the pressure change inside the housing 21.

The contact part 29 is coupled to the displacement part 28, and contacts the partial region of the diaphragm 25 on the elastic surface of the contact part 29. The contact part 29 is provided at the center position of the displacement part 28, for example, and is provided at a position where the plurality of rod-shaped members of the displacement part 28 are joined in the example shown in FIG. 5. The contact part 29 has elasticity such that when the user removes the earphone 1 from the ear, the inside of the housing 21 is depressurized and the diaphragm 25 is displaced toward the sound emitting part 30, causing the surface of the contact part 29 to deform.

The contact part 29 has fluidity such that the contact part 29 forms a curved surface due to surface tension before hardening. The contact part 29 is preferably made of resin that increases in elasticity over time and has elasticity after hardening. By having the contact part 29 made of such a material, the contact part 29 can be easily formed into a desired shape. Examples of such materials include, but are not limited to, nitrile rubber adhesives, synthetic rubber adhesives, vinyl adhesives, silicone rubber, and sponges. The contact part 29 may be made of the same material as the displacement part 28, or may be made of ABS resin, for example. Since the contact part 29 is made of an elastic material, the diaphragm 25 is not locally stressed from the contact part 29, such that the diaphragm 25 is difficult to damage.

The displacement amount of the tip of the contact part 29 when a predetermined stress in the direction that the diaphragm 25 is displaced is applied to the contact part 29 is preferably larger than the displacement amount of the displacement part 28 when the predetermined stress in the direction that the diaphragm 25 is displaced is applied to the displacement part 28. By having the contact part 29 configured in this manner, when the diaphragm 25 is displaced toward the sound emitting part 30 due to a change in the internal pressure of the housing 21, the contact part 29 is deformed before the displacement part 28 is displaced. Said deformation of the contact part 29 reduces the stress applied to the diaphragm 25.

Figure 6:
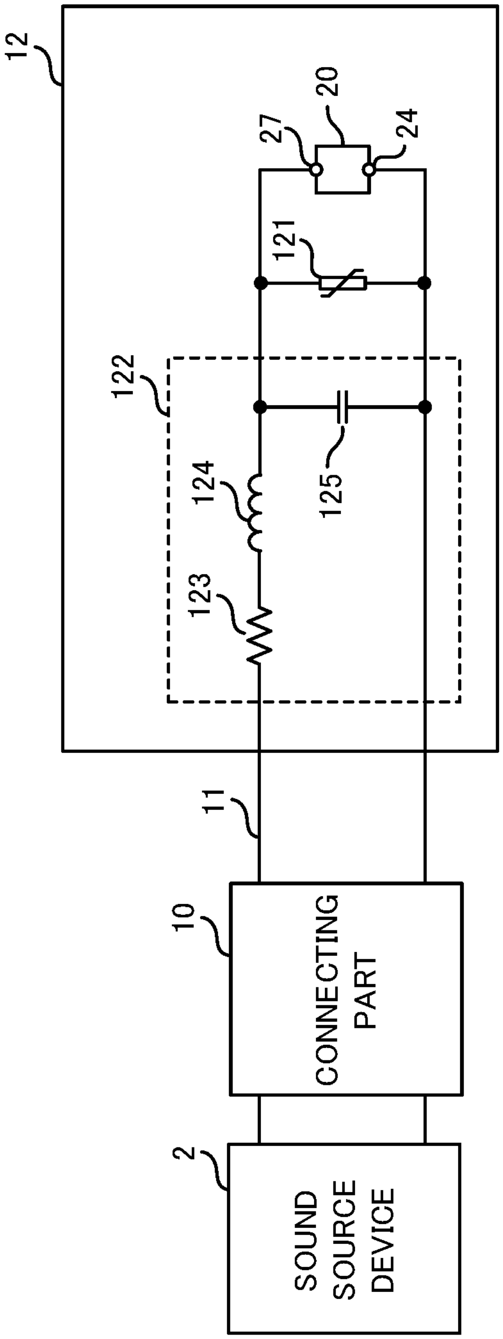
FIG. 6 shows an electric circuit included in the earphone 1.

FIG. 6 shows an electric circuit included in the earphone 1. FIG. 6 shows a part of the electric circuit accommodated in the rear housing 12. Specifically, the rear housing 12 includes a varistor 121 and a resonance circuit 122 connected between the terminal 24 and the conductive member 27 of the electro-acoustic transducer 20. The varistor 121 prevents excessive voltage from being applied to the electro-acoustic transducer 20.

The resonance circuit 122 is a circuit for outputting the adjusted signal. The adjusted signal is a signal obtained by making a signal component of a predetermined resonance frequency contained in the electric signal outputted from the sound source device 2 larger than a signal component of other frequencies. The resonance circuit 122 includes a resistor 123, an inductor 124, and a capacitor 125 that constitute a series resonance circuit, for example. Specifically, the resonance circuit 122 includes i) the resistor 123 and the inductor 124 connected in series with each other between the connecting part 10 and the diaphragm 25 and ii) the capacitor 125 as an example of a capacitance circuit provided between the fixed electrode 22 and the diaphragm 25.

In the earphone 1, since the center portion of the diaphragm 25 is pressed against the fixed electrode 22 by the contact part 29, the capacitance generated by the fixed electrode 22 and the diaphragm 25 is larger than that generated when the diaphragm 25 is not pressed against the fixed electrode 22 by the contact part 29. Such a configuration realizes a capacitance of 60 pF or more, for example, for the capacitance generated by the fixed electrode 22 and the diaphragm 25. In this case, the inductance value of the inductor 124 required for setting a resonance frequency of the resonance circuit 122 to about 10 KHz is 2.0 H or less, and the size of the inductor 124 can be reduced.

As an example, if the capacitance of the electro-acoustic transducer 20 is 120 pF and the capacitance of the varistor 121 is 130 pF, the resonance frequency of the resonant circuit 122 is caused to be about 10 KHz by setting the resistance of the resistor 123 to 420Ω, the inductance of the inductor 124 to 400 mH, and the capacitance of the capacitor 125 to 220 pF. Although FIG. 6 shows the case where the resonance circuit 122 is a series resonance circuit, the resonance circuit 122 is not limited to the series resonance circuit including the resistor 123, the inductor 124, and the capacitor 125, and may be a parallel resonance circuit or a circuit combining the series resonance circuit and the parallel resonance circuit. It should be noted that the resonance frequency is not limited to 10 KHz, and the sensitivity at other frequencies can be adjusted by adjusting the characteristics of the resonance circuit 122.

In addition, by setting the capacitance value of the capacitor 125 to be sufficiently larger than the capacitance value of the electro-acoustic transducer 20 (for example, ten times or more), the variation of the resonance frequency caused by the variation of the capacitance value of the electro-acoustic transducer 20 is suppressed.

EMBODIMENT EXAMPLES

Embodiment Example 1

First, the frequency characteristics of the sensitivity of a first earphone 1, which includes the electro-acoustic transducer 20 with the configuration shown in FIGS. 3 to 5 and does not include the resonance circuit 122, were measured. As a comparative example, the frequency characteristics of the sensitivity of the earphone without the resonance circuit 122, the displacement part 28, and the contact part 29 were measured.

Figure 7:
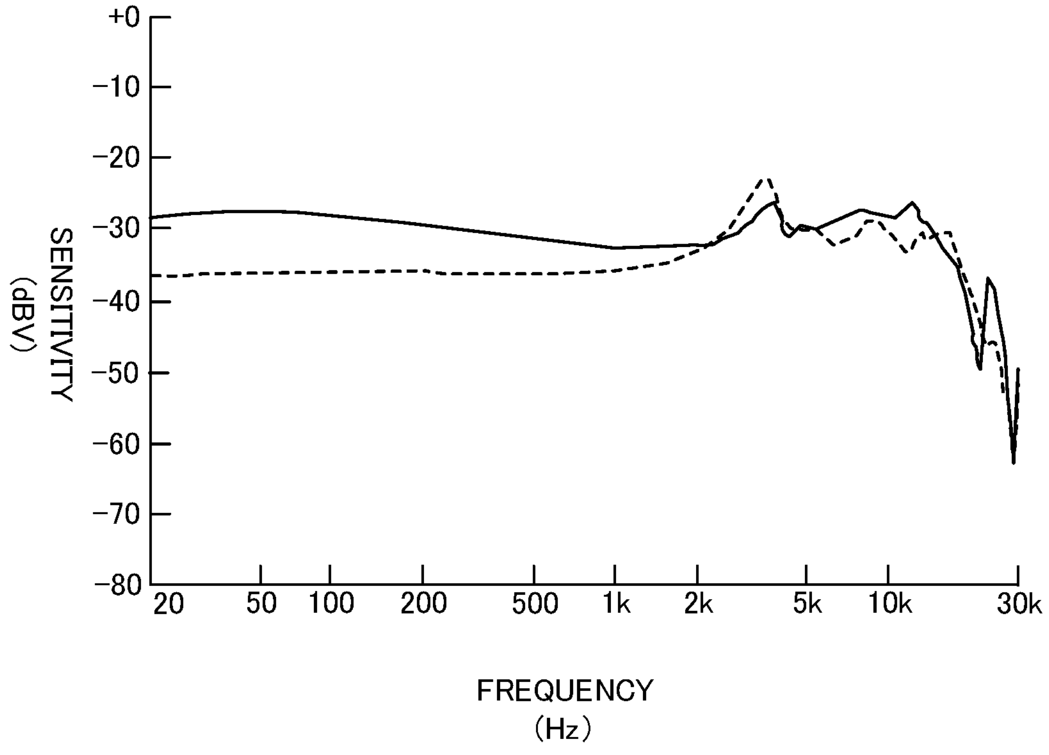
FIG. 7 shows a measurement result of the frequency characteristics of the sensitivity of the earphone 1 without a series resonance circuit.

FIG. 7 shows a measurement result of the frequency characteristics of the sensitivity of the earphone 1 without the resonance circuit 122. In FIG. 7, the horizontal axis represents frequency, and the vertical axis represents sensitivity. In FIG. 7, the solid line shows the frequency characteristics of the sensitivity of the earphone 1 having the displacement part 28 and the contact part 29. The broken line shows the frequency characteristics of the sensitivity of the earphone without the displacement part 28 and the contact part 29.

As is apparent from FIG. 7, in the range of 1 kHz or lower, the sensitivity of the earphone 1 with the displacement part 28 and the contact part 29 is 5 dB to 10 dB better than the sensitivity of the earphone without the displacement part 28 and the contact part 29. This is because the contact part 29 having elasticity presses the center portion of the diaphragm 25 against the fixed electrode 22, such that the distance from the fixed electrode 22 varies depending on the position of the diaphragm 25.

Embodiment Example 2

Figure 8:
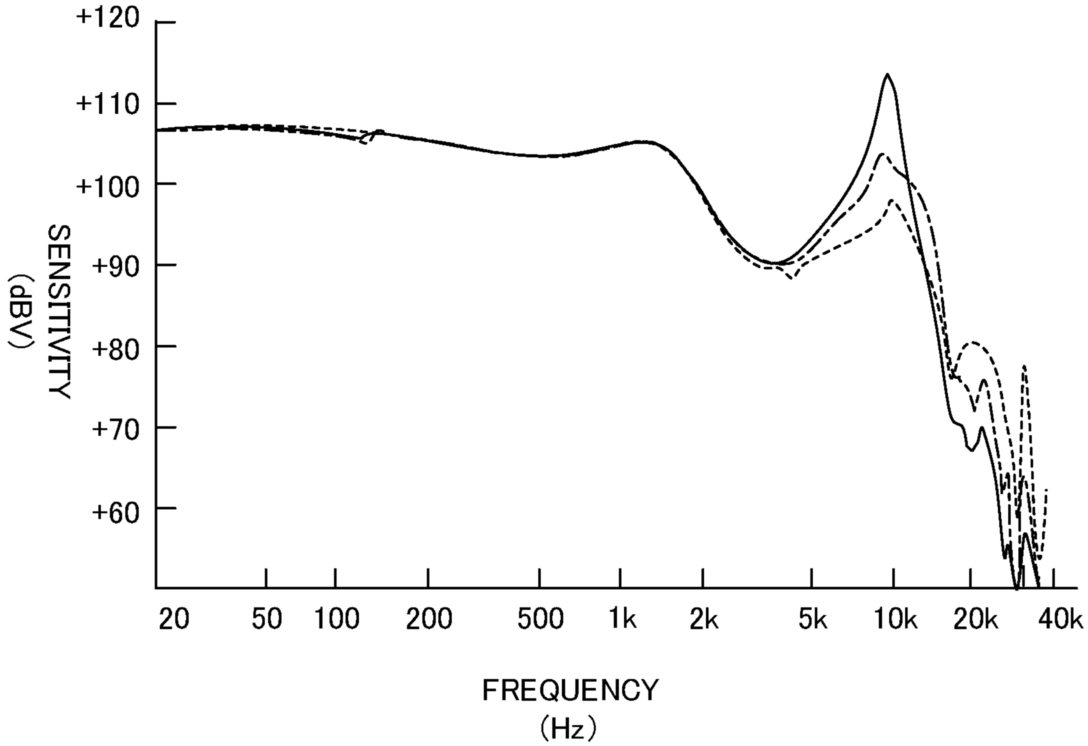
FIG. 8 shows a measurement result of the frequency characteristics of the sensitivity of the earphone 1 with the series resonance circuit.

A result of a comparison between i) a second earphone 1 with the resonance circuit 122 together with the electro-acoustic transducer 20 having the configuration shown in FIGS. 3 to 5 and ii) the first earphone 1 is shown below. FIG. 8 shows a measurement result of the frequency characteristics of the sensitivity of the earphone 1 with the series resonance circuit including the varistor 121, the resonance circuit 122, and the resistor 123.

The solid line in FIG. 8 shows the frequency characteristics of the sensitivity of the earphone 1 with the resonance circuit 122 including the resistor 123 having a resistance value of 420Ω, the inductor 124 having an inductance value of 400 mH, and the capacitor 125 having a capacitance value of 220 pF. The broken line shows the frequency characteristics of the sensitivity of the earphone 1 without the resonance circuit 122. The dot-dash line shows the frequency characteristics of the sensitivity of the earphone 1 with a resonance sharpness smaller than that of the earphone 1 having the resonance circuit 122 shown by the solid line.

It can be seen from the comparison result between the characteristics shown by the solid line and the dot-dash line and the characteristics shown by the broken line that there is a large difference in the sensitivity around 10 kHz. Specifically, the sensitivity near 10 kHz in the case of having a first series resonance circuit shown by the solid line is greater than the sensitivity near 10 kHz in the case of not having the first series resonance circuit by 15 dB or more. Thus, since the earphone 1 includes the resonance circuit 122, the sensitivity in the frequency band of 1 kHz or lower is improved, and so is the sensitivity near the resonance frequency of the resonance circuit 122.

Further, the sensitivity near 10 kHz in the case of having the first series resonance circuit shown by the solid line and the sensitivity near 10 kHz in the case of having the second series resonance circuit shown by the dot-dash line are different by about 10 dB. Thus, it is easy to design the earphones 1 with different sensitivities around 10 kHz by controlling the resonance sharpness of the series resonance circuit.

[First Variation of Resonance Circuit 122]

Figure 9:
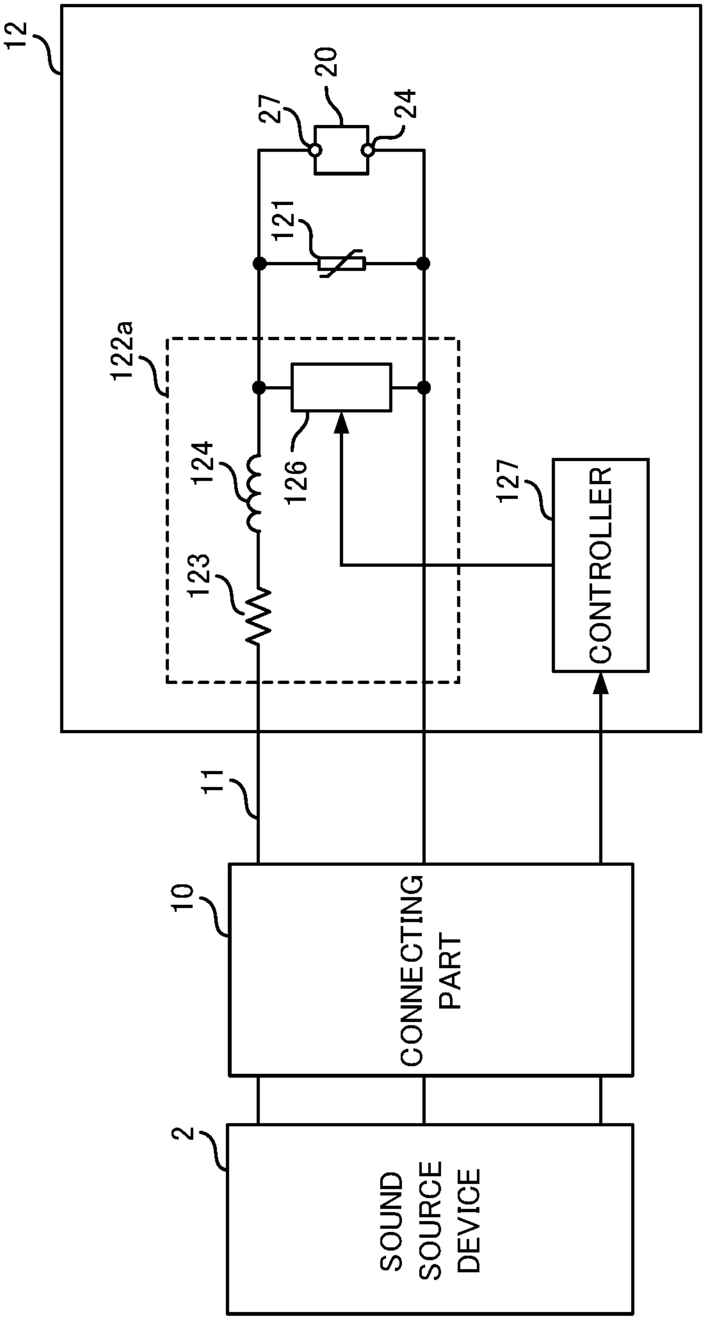
FIG. 9 shows a resonance circuit 122*a* as a first variation of a resonance circuit 122.

FIG. 9 shows a resonance circuit **122*a* as a first variation of the resonance circuit 122. The resonance circuit 122*a* shown in FIG. 9 includes a capacitance circuit 126 whose capacitance value varies under the control of a controller 127, instead of the capacitor 125 in the resonance circuit 122. The controller 127 is a Central Processing Unit (CPU), for example. The controller 127 acquires setting information for setting the capacitance value of the capacitance circuit 126, and controls the capacitance value on the basis of the acquired setting information. For example, the controller 127 acquires the setting information inputted in the sound source device 2 executing an application program, and controls the capacitance value of the capacitance circuit 126** on the basis of the acquired setting information.

The capacitance circuit 126 is a variable capacitance diode whose capacitance value varies according to an inputted voltage, for example. In this case, the controller 127 controls the capacitance value of the capacitance circuit 126 by applying a voltage corresponding to the acquired setting information to the capacitance circuit 126.

The capacitance circuit 126 may include a plurality of capacitors having different capacitances and a switch for selecting some of the capacitors. In this case, the controller 127 may control the capacitance value of the capacitance circuit 126 by switching the switch. Thus, since the resonance circuit 122*a* is configured such that the capacitance value of the capacitance circuit 126 can be controlled by the controller 127, the resonance frequency of the resonance circuit 122*a* changes under the control of the controller 127. As a result, the user using the earphone 1 connected to the sound source device 2 can adjust the frequency characteristics of the sensitivity of the earphone 1 to the desired characteristics.

[Second Variation of Resonance Circuit 122]

Figure 10:
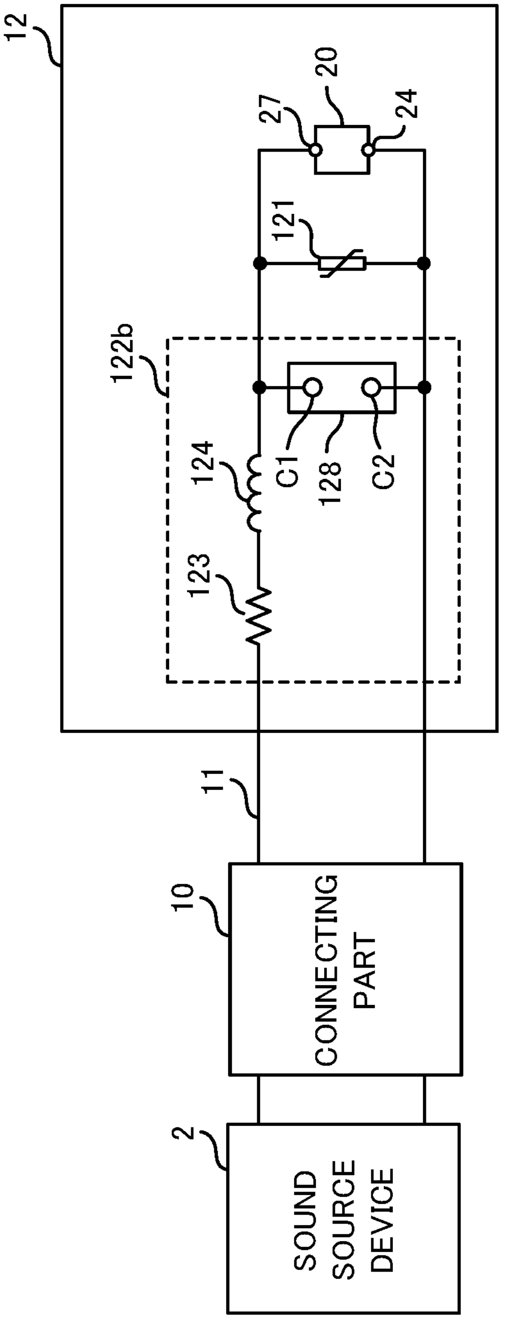
FIG. 10 shows a resonance circuit 122*b* as a second variation of the resonance circuit 122.

FIG. 10 shows a resonance circuit 122*b* as a second variation of the resonance circuit 122. The resonance circuit 122*b* shown in FIG. 10 includes a capacitance circuit 128 instead of the capacitor 125 in the resonance circuit 122. The capacitance circuit 128 includes capacitor connecting parts C1 and C2 that connect the capacitor between the fixed electrode and the diaphragm in a state where the capacitor connected between the fixed electrode and the diaphragm can be replaced. The capacitor connecting parts C1 and C2 are conductive terminals and are exposed to the outside of the rear housing 12. The user of earphone 1 can change the resonance frequency of the resonance circuit 122*b* and adjust the frequency characteristics of the sensitivity of the earphone 1 to the desired characteristics by replacing the capacitor mounted between the capacitor connecting part C1 and the capacitor connecting part C2 with capacitors having other capacitances.

It should be noted that the resonance circuit 122*b* shown in FIG. 10 does not include the capacitor 125 shown in FIG. 6, but may include the capacitor 125 in parallel with the capacitance circuit 128. In the case where the resonance circuit 122*b* has such a configuration, the user only needs to mount the capacitor to the capacitance circuit 128 if he/she wants to change the resonance frequency of the resonance circuit 122*b*.

[First Variation of Electro-Acoustic Transducer 20]

Figure 11:
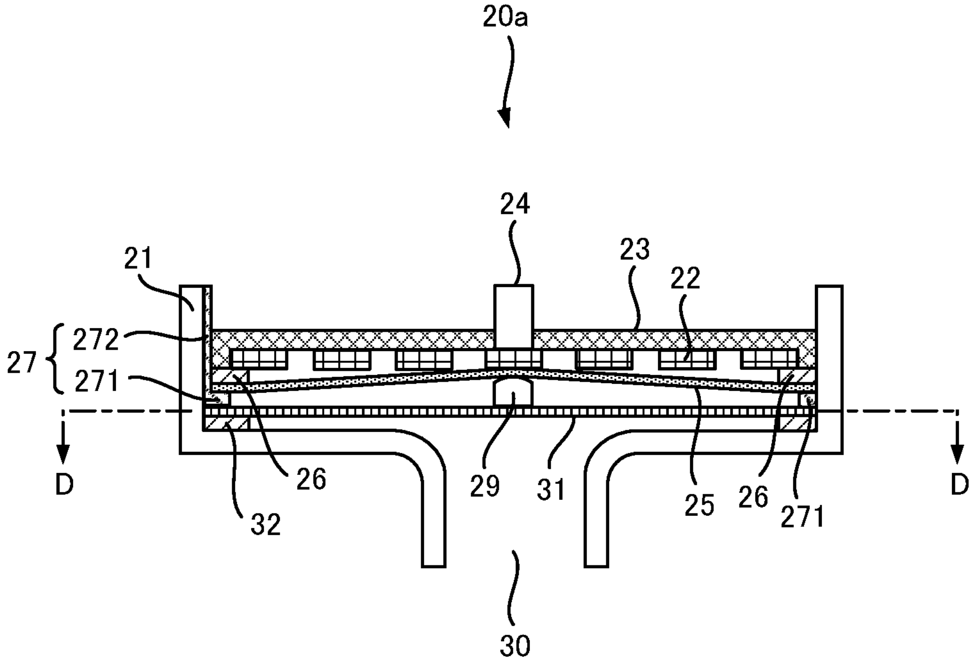
FIG. 11 shows an internal configuration of an electro-acoustic transducer 20*a*.
Figure 12:
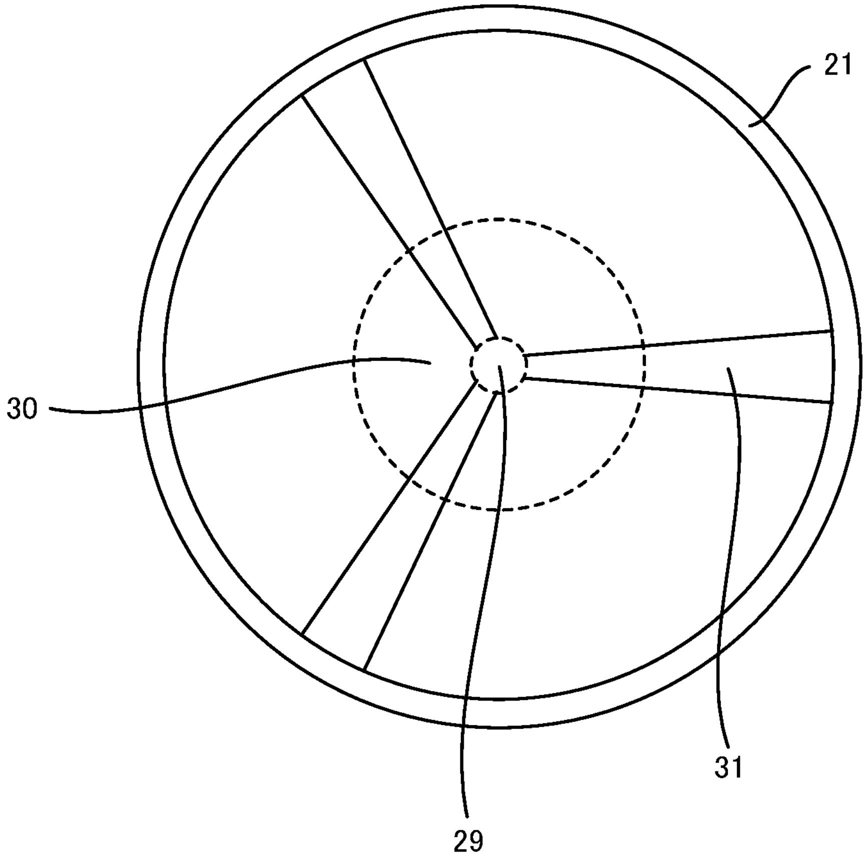
FIG. 12 is a cross-sectional view at a line D-D in FIG. 11.

FIGS. 11 and 12 show an internal configuration of an electro-acoustic transducer 20*a* as a first variation of the electro-acoustic transducer 20. FIG. 12 is a cross-sectional view at a line D-D in FIG. 11. In the electro-acoustic transducer 20 shown in FIGS. 4 and 5, one end of the displacement part 28 is fixed to the position of the opening of the sound emitting part 30, whereas in the electro-acoustic transducer 20*a* shown in FIGS. 11 and 12, the displacement part 31 is provided such that the displacement part 31 faces the entire surface of the diaphragm 25. The rod-shaped member of the displacement part 31 is longer than the rod-shaped member of the displacement part 28.

The displacement part 31 is fixed such that the displacement part 31 is sandwiched between a spacer 32 and the conductive member 27. The spacer 32 is an annular member and is fixed to the inner surface of the housing 21. Since the spacer 32 has a thickness greater than the displacement width of the displacement part 31, the displacement part 31 does not contact the housing 21 even if the displacement part 31 is maximally displaced. Thus, the electro-acoustic transducer 20*a* includes the displacement part 31 with the rod-shaped member longer than the displacement part 28, such that the displacement part 31 is easier to bend than the displacement part 28 when the pressure inside the electro-acoustic transducer 20*a* changes and the diaphragm 25 is displaced. Therefore, the stress applied to the diaphragm 25 can be further reduced.

Furthermore, the rod-shaped member included in the displacement part 31 has a shape that becomes thinner toward the position where the contact part 29 is provided, for example. Since the rod-shaped member has such a shape, the periphery of the displacement part 31 is fixed in a stable manner and the vicinity of the displacement part 31 where the contact part 29 is provided bends easily.

[Second Variation of Electro-Acoustic Transducer 20]

Figure 13:
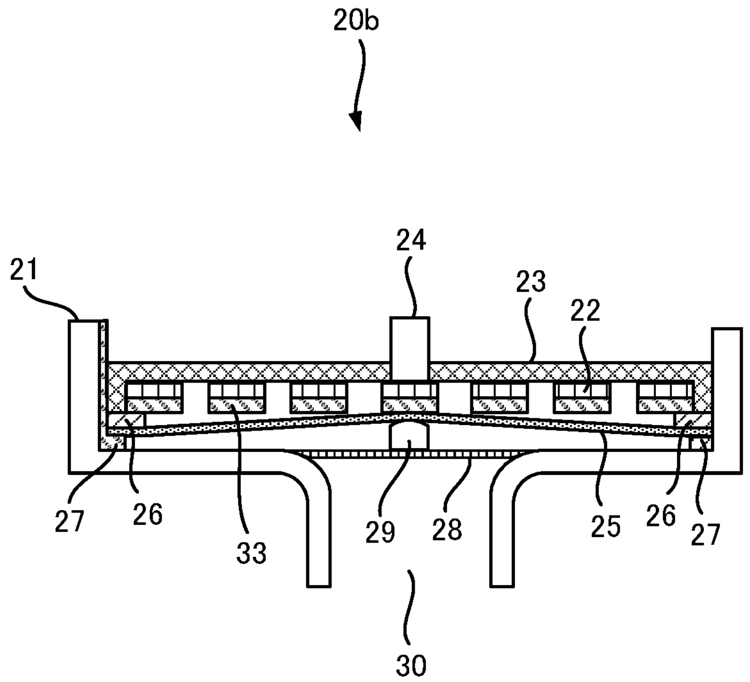
FIG. 13 shows an internal configuration of an electro-acoustic transducer 20*b*.

FIG. 13 shows an internal configuration of an electro-acoustic transducer 20*b* which is a second variation of the electro-acoustic transducer 20. The electro-acoustic transducer 20*b* shown in FIG. 13 is different from the electro-acoustic transducer 20 in that the electro-acoustic transducer 20*b* includes an electret layer 33, and other configurations are similar to those of the electro-acoustic transducer 20. The electret layer 33 contains a dielectric that semi-permanently retains charges, and applies the bias voltage to the fixed electrode 22.

The electret layer 33 is provided on a surface of the fixed electrode 22 facing the diaphragm 25. The periphery of the diaphragm 25 is sandwiched between the annular insulating member 26 and the conductive member 27.

In the example shown in FIG. 13, the electret layer 33 is accommodated in a concave portion of the fixed electrode cover 23 in a state of being overlapped with the fixed electrode 22. The electret layer 33 has sound holes in the same positions as the sound holes 221 formed in the fixed electrode 22. The sound holes are formed in the fixed electrode 22 and the electret layer 33 by punching them out while they are overlapped, for example. Since the electro-acoustic transducer 20*b* includes the electret layer 33 as described above, there is no need to apply a DC bias voltage via an external amplifier or transformer, which improves user-friendliness.

[Third Variation of Electro-Acoustic Transducer 20]

Figure 14:
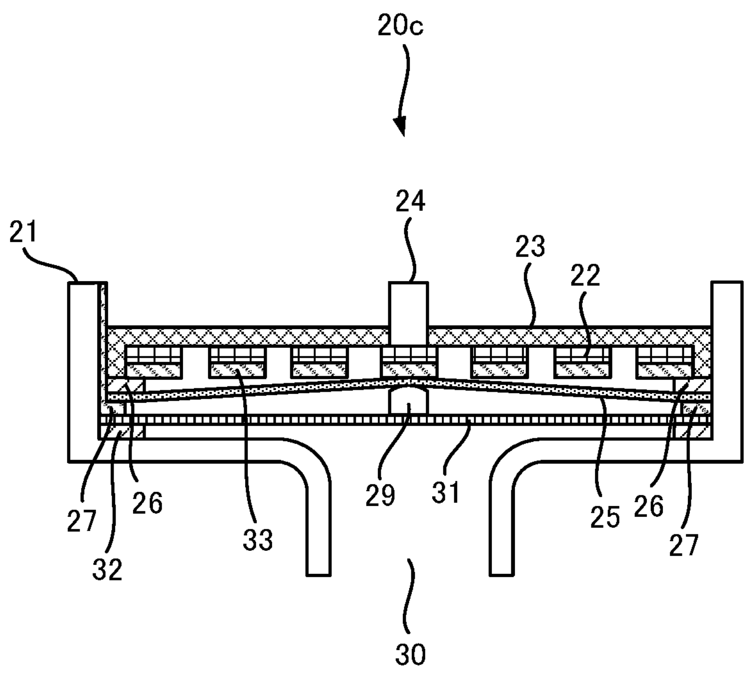
FIG. 14 shows an internal configuration of an electro-acoustic transducer 20*c*.

FIG. 14 shows an internal configuration of an electro-acoustic transducer 20*c* which is a third variation of the electro-acoustic transducer 20. The electro-acoustic transducer 20*c* includes the displacement part 31 of the electro-acoustic transducer 20*a* shown in FIG. 11 instead of the displacement part 28 of the electro-acoustic transducer 20*b*. The displacement part 31 is sandwiched between the conductive member 27 and the spacer 32. As shown in the first through third variations above, the combination of the means of applying the bias voltage to the fixed electrode 22 and the means of displacing the contact part 29 are arbitrary.

[Variation of Displacement Part 28]

Figure 15:
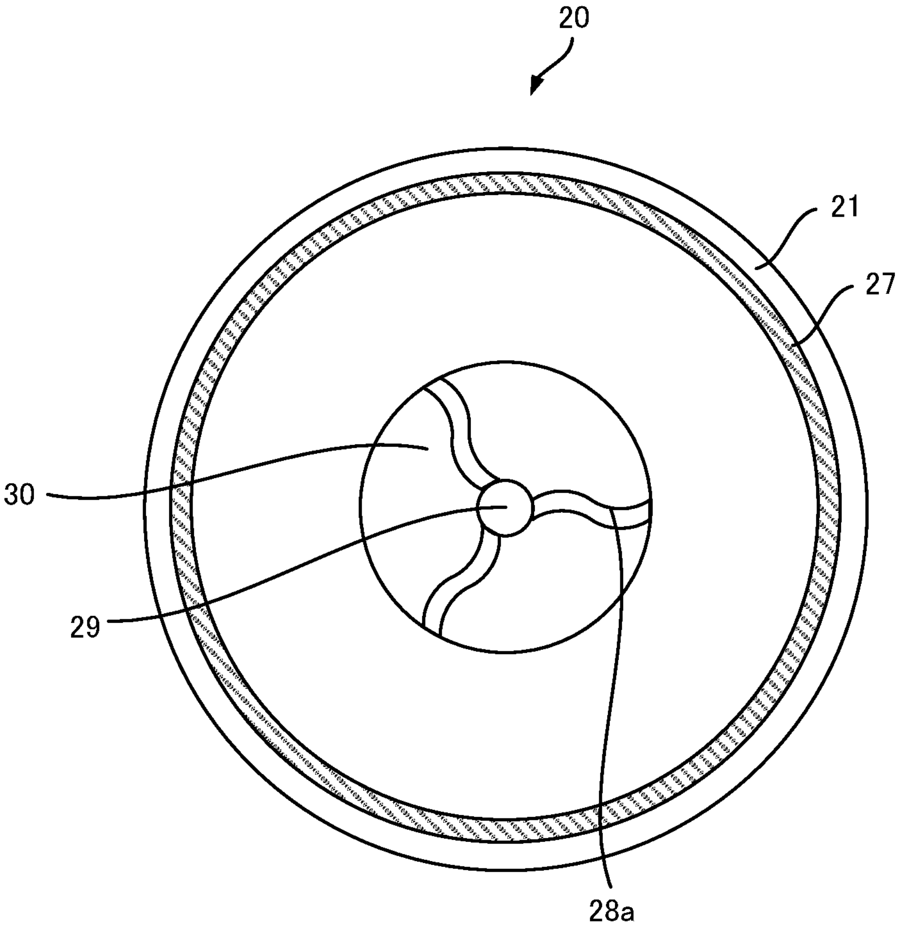
FIG. 15 shows a shape of a displacement part 28*a*.

FIG. 15 shows a shape of the displacement part 28*a* which is a variation of the displacement part 28. While the displacement part 28 shown in FIG. 5 is composed of a linear rod-shaped member, the displacement part 28*a* includes a curved member longer than the radius of the sound emitting part 30. Since the displacement part 28*a* includes such a curved member, the displacement part 28*a* can be displaced more than the displacement part 28 in the direction in which the sound is emitted from the sound emitting part 30.

[Variation of Capacitive-Type Electro-Acoustic Transducer]

The above description has exemplified a canal-type earphone 1 as the capacitive-type electro-acoustic transducer and the case where the electro-acoustic transducers 20, 20*a*, 20*b*, and 20*c* are provided in the canal-type earphone, but the capacitive-type electro-acoustic transducer is not limited to the canal-type earphone 1. The capacitive-type electro-acoustic transducer can be applied to any device that has the ability to transduce the electric signal into the sound. For example, the capacitive-type electro-acoustic transducer may be an overhead headphone.

[Effects of Electro-Acoustic Transducer According to the Present Embodiment]

As described above, the earphone 1 includes the resonance circuit 122 in the preceding stage of the electro-acoustic transducers 20, 20*a*, 20*b*, and 20*c*. Since the earphone 1 includes the resonance circuit 122, the sensitivity in the high-pitched sound range can be easily increased, such that the earphone 1 according to the present embodiment has the capacitive-type electro-acoustic transducers 20, 20*a*, 20*b*, and 20*c* to achieve miniaturization and a wider dynamic range.

In particular, the electro-acoustic transducers 20, 20*a*, 20*b*, and 20*c* have structures in which the diaphragm 25 is pressed against the fixed electrode 22 by the contact part 29. Therefore, the earphone 1 according to the present embodiment can set the capacitance value to 60 pF or more, which is larger than that of the conventional capacitive-type electro-acoustic transducer. As a result, the inductance value of the inductor 124 included in the resonance circuit 122 can be between 10 mH and 2.0 H. Thus, since the electro-acoustic transducers 20, 20*a*, 20*b*, and 20*c* can employ inductors that are smaller in size compared to those of the conventional electro-acoustic transducers, the electro-acoustic transducers 20, 20*a*, 20*b*, and 20*c* are suitable for achieving a smaller size and wider dynamic range of the earphone 1.

In addition, since the electro-acoustic transducers 20, 20*a*, 20*b*, and 20*c* are configured to press the diaphragm 25 against the fixed electrode 22, the sensitivity of the earphone 1 or headphone which is the capacitive-type electro-acoustic transducer of the present embodiment has a sensitivity that is six times better than that of the conventional capacitive-type electro-acoustic transducer. Instead of a high bias voltage of over 120 V from an external power supply or large transformer that is necessary for increasing the sensitivity in the conventional capacitive-type electro-acoustic transducer, the capacitive-type electro-acoustic transducer according to the present embodiment can configure the earphone 1 or headphone with the bias voltage from the electret.

In other words, an earphone or headphone using the conventional capacitive-type electro-acoustic transducer is not suitable for outdoor use because said earphone or headphone requires a special power supply or transformer and amplifier. In contrast, in the earphone 1 or headphone using the capacitive-type electro-acoustic transducer of the present embodiment, the bias voltage is applied by the electret, such that even a small transformer or amplifier can provide the volume necessary for music appreciation. Thus, the earphone 1 or headphone according to the present embodiment has a configuration suitable for outdoor use.

Further, even in a configuration where the bias voltage is applied by an external power supply, the bias voltage for the earphone 1 or headphone using the capacitive-type electro-acoustic transducer of the present embodiment can be supplied by the sound source device. In other words, since a large bias voltage is not required as in the past, a special power supply for applying the bias voltage is also not required.

It should be noted that these small transformers or amplifiers are accommodated in the connecting part 10 in the present embodiment, but the sound source device 2 may include said transformers and amplifiers. Further, if a wireless connection is used for the connection between the earphone 1 or headphone and the sound source device 2, a small transformer or amplifier may be provided in the receiving part of the earphone 1 or headphone.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A capacitive-type electro-acoustic transducer comprising:

a resonance circuit that outputs an adjusted signal obtained by making a signal component of a predetermined frequency contained in an electric signal outputted from a sound source device larger than a signal component of another frequency;

a fixed electrode that is fixed to a housing;

a diaphragm that is provided facing the fixed electrode and that vibrates according to a potential difference generated between the diaphragm and the fixed electrode on the basis of the adjusted signal;

a contact part that contacts a partial region of the diaphragm and presses the partial region against the fixed electrode; and a sound emitting part that emits sound generated by vibration of the diaphragm to the outside of the housing.

2. The capacitive-type electro-acoustic transducer according to claim 1, further comprising:

a connecting part that is connected to the sound source device, wherein the resonance circuit includes:

a resistor and an inductor connected in series with each other between the connecting part and the diaphragm, and a capacitance circuit provided between the fixed electrode and the diaphragm.

3. The capacitive-type electro-acoustic transducer according to claim 2, wherein a capacitance value of the capacitance circuit is ten times or more larger than the capacitance value of an electro-acoustic transducer including the fixed electrode, the diaphragm, the contact part, and the sound emitting part.

4. The capacitive-type electro-acoustic transducer according to claim 2, further comprising:

a controller that acquires setting information for setting the capacitance value of the capacitance circuit and that controls the capacitance value on the basis of the acquired setting information.

5. The capacitive-type electro-acoustic transducer according to claim 4, wherein the sound source device is an information terminal that executes an application program, and the controller acquires the setting information inputted in the information terminal executing the application program.

6. The capacitive-type electro-acoustic transducer according to claim 2, wherein the capacitance circuit includes:

a capacitor connecting part that connects a capacitor between the fixed electrode and the diaphragm in a state where the capacitor connected between the fixed electrode and the diaphragm can be replaced.

7. The capacitive-type electro-acoustic transducer according to claim 6, wherein the capacitor connecting part is exposed to the outside of the housing of the capacitive-type electro-acoustic transducer.

8. The capacitive-type electro-acoustic transducer according to claim 2, wherein a capacitance generated by the fixed electrode and the diaphragm is 60 pF or more, and an inductance value of the inductor is 2.0 H or less.

9. The capacitive-type electro-acoustic transducer according to claim 1, wherein a resonance frequency of the resonance circuit is 10 KHz.

10. The capacitive-type electro-acoustic transducer according to claim 1, wherein a distance between the diaphragm and the fixed electrode in a partial region of the diaphragm is narrower than a distance between the diaphragm and the fixed electrode outside the partial region of the diaphragm.

11. The capacitive-type electro-acoustic transducer according to claim 10, wherein a distance between the diaphragm and the fixed electrode at the center of the diaphragm is narrower than a distance between the diaphragm and the fixed electrode outside of the center of the diaphragm.

12. The capacitive-type electro-acoustic transducer according to claim 11, wherein a distance between the diaphragm and the fixed electrode becomes wider from the center of the diaphragm toward the periphery of the diaphragm.

* * * * *